United States Patent [19]
Attard

[11] Patent Number: 6,081,634
[45] Date of Patent: Jun. 27, 2000

[54] ALL-FIBER OPTICALLY-CONTROLLED OPTICAL SWITCH

[75] Inventor: Alfred E. Attard, Columbia, Md.

[73] Assignee: The United States of America as represented by the National Security Agency, Washington, D.C.

[21] Appl. No.: 09/160,327

[22] Filed: Sep. 25, 1998

[51] Int. Cl.[7] .................................................. G02B 6/26
[52] U.S. Cl. .............................. 385/16; 385/15; 385/30; 385/39; 385/42; 385/49
[58] Field of Search .................................. 385/1, 2, 4, 8, 385/14, 15, 16, 20, 24, 27, 28, 30, 39, 40, 41, 49, 42

[56] References Cited

U.S. PATENT DOCUMENTS

| | | | |
|---|---|---|---|
| 3,208,342 | 9/1965 | Nethercot | 385/16 X |
| 3,899,235 | 8/1975 | Arnaud et al. | 385/49 X |
| 4,012,113 | 3/1977 | Kogelnik et al. | 385/16 X |
| 4,035,058 | 7/1977 | Papuchon | 385/16 X |
| 4,453,802 | 6/1984 | Bridges et al. | 385/30 X |
| 4,679,894 | 7/1987 | Pavlath | 385/30 X |
| 4,720,174 | 1/1988 | Baker | 385/16 X |
| 4,721,352 | 1/1988 | Sorin et al. | 385/30 X |
| 4,842,368 | 6/1989 | Darcie et al. | 385/16 X |
| 4,991,920 | 2/1991 | Peczalski | 385/14 X |
| 5,037,169 | 8/1991 | Chun | 385/16 |
| 5,491,763 | 2/1996 | Van Deventer et al. | 385/24 |
| 5,815,309 | 9/1998 | Lawrence et al. | 385/30 X |
| 5,862,276 | 1/1999 | Karras | 385/30 X |
| 5,892,857 | 4/1999 | McCallion | 385/1 |
| 5,907,647 | 5/1999 | Eggleton et al. | 385/28 |
| 6,026,205 | 2/2000 | McCallion et al. | 385/30 |

OTHER PUBLICATIONS

Dietrich Marcuse, Investigation of Coupling Between a Fiber and an Infinite Slab, IEEE, The Journal of Lightwave Technology, vol. 7, No.1 Jan. 1989, pp. 122–130.

*Primary Examiner*—Brian Healy
*Attorney, Agent, or Firm*—Robert D. Morelli

[57] ABSTRACT

The present invention is an optical switch that includes a first optic fiber waveguide, a second optic fiber waveguide, and a third optical waveguide. The three waveguides are in the same plane. The third optical waveguide may be an optic fiber or a slab waveguide. The first and second optic fiber waveguides are close enough to exhibit evanescent wave coupling under non-interference conditions. The second optic fiber waveguide is between the other two waveguides and closer to the third optical waveguide. The first and second optic fiber waveguides have identical propagation constants. An information-bearing optical signal is applied to the first optic fiber waveguide. An optical control signal applied to the third optical waveguide controls its propagation constant and, therefore, controls whether or not switching occurs between the first and second fiber optic waveguides. The optical switch may be made to be normally on or normally off.

16 Claims, 2 Drawing Sheets

ALL-FIBER OPTICALLY-CONTROLLED OPTICAL SWITCH

FIELD OF THE INVENTION

The present invention relates, in general, to optic systems and elements and, in particular, to optical switches.

BACKGROUND OF THE INVENTION

An optical switch is a device where information-bearing light may be directed to one of several outputs. Prior art optical switches have, mainly, been integrated optical waveguide structures such as titanium-diffused (Ti) waveguides in lithium-niobate (LiNbO3) or gallium-arsenide (GaAs) structures or other compound semiconductors. One problem with integrated optic switches is that they may be connected to an optic fiber since such fibers are the primary carriers of optical communications. Coupling between integrated optic switches and optical fiber is an inefficient process because of the modal fields of these two elements are not compatible, and large differences in the indices of refraction lead to large reflection losses.

The prior art optical switches have been controlled, primarily, by electro-optic or acousto-optic techniques. In such an arrangement, the waveguides of the optical switch are separated or surrounded by electro-optic, or acousto-optic, material that controls the coupling between the waveguides. Such control is not the fastest control possible because coupling in such devices occurs through the electro-optic, or acousto-optic, material. Also, Such control does not provide a system optimized with respect to the number of elements contained therein.

An optical switch comprising two optical fibers has been suggested where switching is controlled by varying the index of refraction of one of the fibers. One of the fibers must exhibit a large non-linear optical coefficient and a linear index of refraction. Since fiber optic transmission lines do not, typically, exhibit both of these characteristics, losses may occur where such a switch is coupled to the fiber optic transmission lines due to the mismatch of materials. Furthermore, there is no isolation between the control signal and the optical signal in such a device, and undesirable interaction may occur.

In an article entitled "Investigation of Coupling Between a Fiber and an Infinite Slab," published by the IEEE in The Journal of Lightwave Technology, Vol. 7, No. 1, January 1989, Dietrich Marcuse discloses a two-fiber optical switch as described above where one of the fibers is replaced with a slab waveguide. Although the slab waveguide provides benefits such as providing couplings between more modes than can a two-fiber optical switch, a slab-fiber optical switch still suffers from the problems listed above for a two-fiber optical switch.

U.S. Pat. No. 3,208,342, entitled "ELECTRO-OPTIC LIGHT COUPLING OF OPTICAL FIBERS"; U.S. Pat. No. 4,012,113, entitled "ADJUSTABLE OPTICAL SWITCH OR MODULATOR"; U.S. Pat. No. 4,035,058, entitled "ELECTRO-OPTICAL SWITCH AND A METHOD OF MANUFACTURING SAME"; U.S. Pat. No. 4,842,368, entitled "NXN SINGLE-MODE OPTICAL WAVEGUIDE COUPLER"; and U.S. Pat. No. 4,991,920, entitled "OPTICAL CONVERTER"; each disclose a device for coupling light. These devices each suffer from the problems listed above for an electro-optic device. U.S. Pat. Nos. 3,208,342; 4,012,113; 4,035,058; 4,842,368; and 4,991,920 are hereby incorporated by reference into the specification of the present invention.

U.S. Pat. No. 3,899,235, entitled "SLAB-COUPLED OPTICAL WAVEGUIDE," discloses a device for coupling light. Such a device suffers from the problems listed above for a two-fiber optical switch where one of the fibers is replaced with a slab waveguide. U.S. Pat. No. 3,899,235 is hereby incorporated by reference into the specification of the present invention.

U.S. Pat. No. 5,491,763, entitled "OPTICAL HYBRID WITH 3×3 COUPLING DEVICE," discloses a device for coupling light. Such a device includes a first waveguide and a second waveguide of identical index of refraction placed symmetrically about a third waveguide of a different and fixed index of refraction so that the first waveguide and the second waveguide have the same optical coupling to the third waveguide. The device of U.S. Pat. No. 5,491,763 is not maximally efficient since the light coupled between the first waveguide and the second waveguide must pass through the third waveguide. Also, the index of refraction of the third waveguide is fixed so that light is always coupled between the first waveguide and the second waveguide. U.S. Pat. No. 5,491,763 is hereby incorporated by reference into the specification of the present invention.

SUMMARY OF THE INVENTION

It is an object of the present invention to switch an information-bearing optical signal between a first optic fiber waveguide and a second optic fiber waveguide under control of a third optic fiber waveguide, where the propagation constant of the first optic fiber waveguide is identical to the propagation constant of the second optic fiber waveguide, where the propagation constant of the third optic fiber waveguide may be changed optically in order to control the switching of an optical signal between the first optic fiber waveguide and the second optic fiber waveguide, where the second optic fiber waveguide is in the same plane and between the first optic fiber waveguide and the third optic fiber waveguide, and where the second optic fiber waveguide is closer to the third optic fiber waveguide than to the first optic fiber waveguide.

It is an object of the present invention to switch an information-bearing optical signal between a first optic fiber waveguide and a second optic fiber waveguide under control of a slab waveguide, where the propagation constant of the first optic fiber waveguide is identical to the propagation constant of the second optic fiber waveguide, where the propagation constant of the slab waveguide may be changed optically in order to control the switching of an optical signal between the first optic fiber waveguide and the second optic fiber waveguide, where the second optic fiber waveguide is in the same plane and between the first optic fiber waveguide and the slab waveguide, and where the second optic fiber waveguide is closer to the slab waveguide than to the first optic fiber waveguide.

The device of the present invention is an optical switch where the switching of an information-bearing optical signal between a first optic fiber and a second optic fiber is controlled by an optical control signal applied to a third optical waveguide. The three waveguides are parallel to each other and lie in a single plane. The third optical waveguide may be an optic fiber or a slab waveguide.

The three waveguides are placed so that the second optic fiber is between the first optic fiber and the third optical waveguide. The first and second optic fibers are spaced sufficiently close to each other so that evanescent wave coupling may occur between the first and second optic fibers in the absence of resonant interference from the third optical waveguide. The second optic fiber is placed closer to the third optical waveguide than to the first optic fiber so that the second optic fiber is more strongly coupled to the third optical waveguide than to the first optic fiber.

The propagation constants of the first and second optic fiber are identical. The third optical waveguide may be constructed so that the propagation constant of the third optical waveguide may be the same as, or different from, the propagation constant of the first and second optic fibers. An optical signal may be applied to the third optical waveguide in order to change the propagation constant of the third optical waveguide.

The present invention may come in two different types.

In one type, the propagation constant of the third optical waveguide may be the same as the propagation constant of the first and second optic fibers when an optical control signal is not applied to the third optical waveguide. In this first type, the propagation constant of the third optical waveguide may be changed to be different from the propagation constant of the first and second optic fibers by applying the optical control signal to the third optical waveguide.

In a second type, the propagation constant of the third optical waveguide may be different from the propagation constant of the first and second optic fibers when an optical control signal is not applied to the third optical waveguide. In this second type, the propagation constant of the third optical waveguide may be changed to be the same as the propagation constant of the first and second optic fibers by applying the optical control signal to the third optical waveguide.

If the propagation constant on the third optical waveguide is the same as the propagation constant of the first and second optic fibers if an optical control signal is not applied to the third optical waveguide then an information-bearing optical signal is not switched between the first and second optic fibers due to resonant interference of the third optical waveguide. The information-bearing optical signal is applied to the first optic fiber. By applying the optical control signal to the third optical waveguide, the propagation constant of the third optical waveguide may be changed to be different from the propagation constant of the first and second optic fibers. When the propagation constant of the third optical waveguide is different from the propagation constant of the first and second optic fibers, the information-bearing signal is switched between the first and second optic fibers. In this embodiment, the optical switch is referred to as being normally on.

If the propagation constant on the third optical waveguide is different from the propagation constant of the first and second optic fibers and an optical control signal is not applied to the third optical waveguide then an information-bearing optical signal is switched between the first and second optic fibers. By applying the optical control signal to the third optical waveguide, the propagation constant of the third optical waveguide may be changed to be the same as the propagation constant of the first and second optic fibers. When the propagation constant of the third optical waveguide is the same as the propagation constant of the first and second optic fibers, the information-bearing signal is not switched between the first and second optic fibers due to resonant interference of the third optical waveguide. In this embodiment, the optical switch is referred to as being normally off.

DETAILED DESCRIPTION

The present invention is an optical switch that may utilize standard communicationsized optic fibers for signal transport in and out of the switch so that the signal-bearing materials of the switch match materials to which the switch may be connected. Matching signal-bearing materials minimizes the loss of optical power. The switch is optically controlled so that switching speed is maximized. Control of the switch is separated from the signal transport medium in order to eliminate interference between a control signal and an information-bearing signal and to facilitate the matching of signal-bearing materials.

Figure 1:
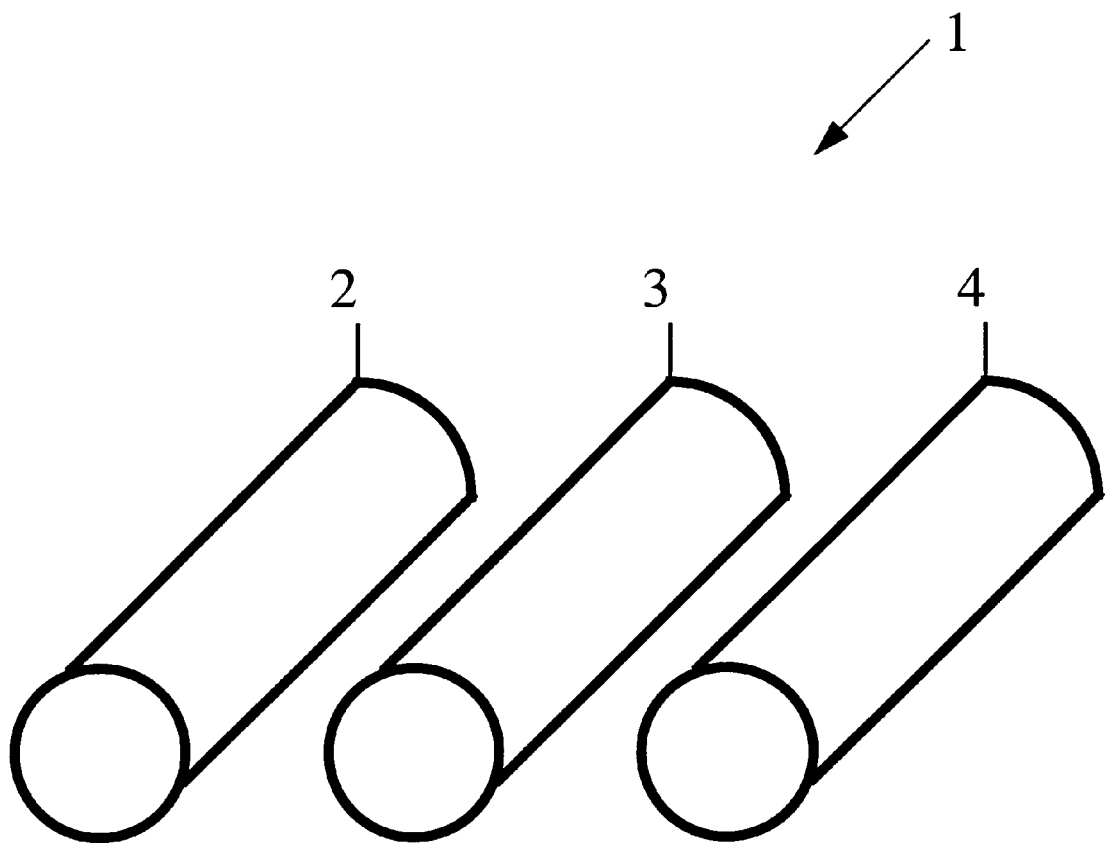
FIG. 1 is a perspective view of the present invention using three optical fibers.

FIG. 1 is a perspective view of the optical switch 1 of the present invention. The optical switch 1 includes a first optic fiber waveguide 2, a second optical fiber waveguide 3, and a third optical waveguide 4. An information-bearing optical signal may be switched between the first optic fiber waveguide 2 and the second optic fiber waveguide 3 under control of the third optical waveguide 4. Switching is controlled by the presence or absence of resonant interference between the third optical waveguide 4 and the second optic fiber waveguide 3. The optical switch 1 of the present invention may come in two different types (i.e., normally on and normally off).

The first optic fiber waveguide 2, the second optic fiber waveguide 3, and the third optical waveguide 4 are parallel to each other, lie in the same plane, and may be placed in a common cladding.

The second optic fiber waveguide 3 is between the first optic fiber waveguide 2 and the third optical waveguide 4. The first optic fiber waveguide 2 and the second optic fiber waveguide 3 are spaced sufficiently close to each other so that evanescent wave coupling occurs between the first optic fiber waveguide 2 and the second optic fiber waveguide 3 when there is no resonant interference between the third optical waveguide 4 and the second optic fiber 3. The second optic fiber waveguide 3 is placed closer to the third optical waveguide 4 than the first optic fiber waveguide 2 in order to establish stronger optic coupling between the third optical waveguide 4 and the second optic fiber waveguide 3 than between the second optic fiber waveguide 3 and the first optic fiber waveguide 2. For an interaction distance of 1 cm, the second optic fiber waveguide 3 may be 17 microns away from the first optic fiber waveguide 2 and 11 microns away from the third optical waveguide 4.

The propagation constant of the first optic fiber waveguide 2 is identical to the propagation constant of the second optic fiber waveguide 3. The propagation constant of the third, and controlling, optical waveguide 4 may, initially, be the same as, or different from, the propagation constant of the second optic fiber waveguide 3 when an optical control signal is not applied to the third optical waveguide 4. The propagation constant of the third, and controlling, optical waveguide 4 may, subsequently, be changed from its initial state by applying an optical control signal to the third optical waveguide 4. If the propagation constant of the third optical waveguide 4 is the same as the propagation constant of the second optic fiber waveguide 3 when an optical control signal is not applied to the third optical waveguide 4 then upon application of the optical control signal to the third optical waveguide 4 the propagation constant of the third optical waveguide 4 will be changed to be different from the propagation constant of the second optic fiber waveguide 3. If the propagation constant of the third optical waveguide 4 is different from the propagation constant of the second optic fiber waveguide 3 when an optical control signal is not applied to the third optical waveguide 4 then upon application of the optical control signal to the third optical waveguide 4 the propagation constant of the third optical waveguide 4 will be changed to be the same as the propagation constant of the second optic fiber waveguide 3.

If the propagation constant of the third optical waveguide 4 is the same as the propagation constant of the second optic fiber waveguide 3 when an optical control signal is not applied to the third optical waveguide 4 then an information-bearing optical signal will not be switched between the first optic fiber waveguide 2 and the second optic fiber waveguide 3 due to resonant interference of the third optical waveguide 4 with the second optic fiber waveguide 3. The information-bearing optical signal is applied to the first optic fiber waveguide 2. If the optical control signal is applied to the third optical waveguide 4 then the propagation constant of the third optical waveguide 4 will be changed to be different from the propagation constant of the second optic fiber waveguide 3. When the propagation constant of the third optical waveguide 4 is different from the propagation constant of the second optic fiber waveguide 3 then the information-bearing optical signal will be switched between the first optic fiber waveguide 2 and the second optic fiber waveguide 3 because there is no resonant interference between the third optical waveguide 4 and the second optic fiber waveguide 3. In this embodiment, the optical switch 1 is referred to as being normally on.

If the propagation constant of the third optical waveguide 4 is different from the propagation constant of the second optic fiber waveguide 3 when an optical control signal is not applied to the third optical waveguide 4 then an information-bearing optical signal will be switched between the first optic fiber waveguide 2 and the second optic fiber waveguide 3 because there is no resonant interference between the third optical waveguide 4 and the second optic fiber waveguide 3. If the optical control signal is applied to the third optical waveguide 4 then the propagation constant of the third optical waveguide 4 will be changed to be the same as the propagation constant of the second optic fiber waveguide 3. When the propagation constant of the third optical waveguide 4 is the same as the propagation constant of the second optic fiber waveguide 3 then the information-bearing optical signal will not be switched between the first optic fiber waveguide 2 and the second optic fiber waveguide 3 due to resonant interference between the third optical waveguide 4 and the second optic fiber waveguide 3. In this embodiment, the optical switch 1 is referred to as being normally off.

The third, and controlling, optical waveguide 4 must have a non-linear optical coefficient and a linear index of refraction that matches the propagation constant of the first optic fiber waveguide 2 and the second optic fiber waveguide 3. For example, the third optical waveguide 4 may be a colloidal suspension of composite metal-coated semiconductor nanoparticles with diameters of 30 to 40 angstroms. By having these conditions met by a control waveguide (i.e., the third optical waveguide 4) instead of an information-bearing signal transport waveguide (i.e., the first optic fiber waveguide 2 and the second optic fiber waveguide 3) then the optical switch 1 may be connected to other signal transmission optic fiber waveguides in order to minimize losses. This is possible because there is no mismatch of materials between the signal transport waveguides.

The third optical waveguide 4 may be an optic fiber or a slab waveguide. In FIG. 1, an optic fiber is used as the third optical waveguide 4.

Figure 2:
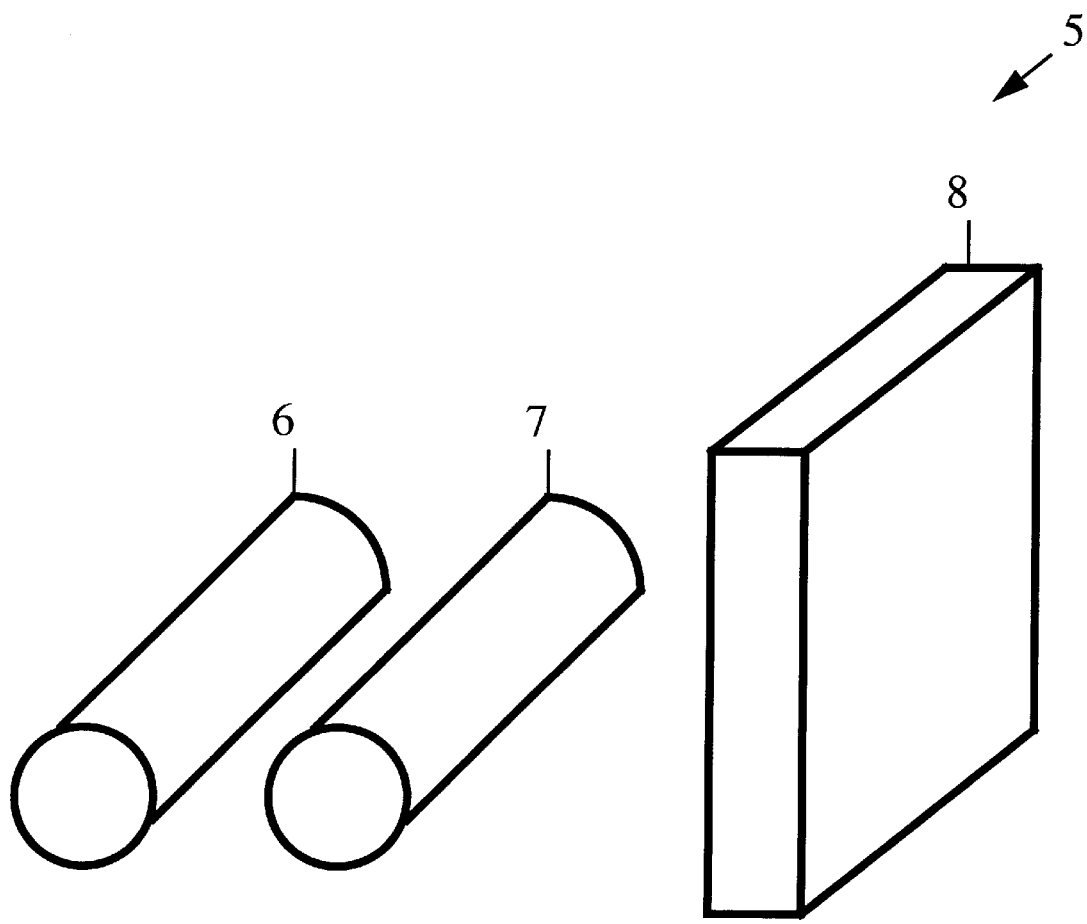
FIG. 2 is a perspective view of an alternate embodiment of the present invention, where a slab waveguide is used as the controlling waveguide.

FIG. 2 is a perspective view of the preferred embodiment of the present invention. That is, an optical switch 5 that includes a first optic fiber waveguide 6, a second optic fiber waveguide 7, and a slab waveguide 8. The optical switch 5 is similar to the optical switch 1 of FIG. 1 in all respects except for a slab waveguide 8 in FIG. 2 that is used as the third optical waveguide 4 of FIG. 1. The optical switch S of FIG. 2 is under all of the physical constraints of the optical switch 1 of FIG. 1. That is, the first optic fiber waveguide 6 of FIG. 2, the second optic fiber waveguide 7, and the slab waveguide 8 are parallel to each other, lie in the same plane, and may be placed in a common cladding. The second optic fiber waveguide 7 is between the first optic fiber waveguide 6 and the slab waveguide 8. The first optic fiber waveguide 6 and the second optic fiber waveguide 7 are spaced sufficiently close to each other so that evanescent wave coupling occurs between the first optic fiber waveguide 6 and the second optic fiber waveguide 7 when there is no resonant interference between the slab waveguide 8 and the second optic fiber 7. The second optic fiber waveguide 7 is placed closer to the slab waveguide 8 than the first optic fiber waveguide 6 in order to establish stronger optic coupling between the slab waveguide 8 and the second optic fiber waveguide 7 than between the second optic fiber waveguide 7 and the first optic fiber waveguide 6. The optical switch 5 functions the same as the optical switch 1 of FIG. 1 except for the added capability provided by the slab waveguide 8 of FIG. 2. That is, the slab waveguide 8 allows a larger number of indices of refraction to be selected in order to match the propagation constant of the second optic fiber waveguide 7. The slab waveguide 8 also provides isolation between the optical control signal applied to the slab waveguide 8 and the information-bearing optical signal applied to the first optic fiber waveguide 6.

What is claimed is:

1. An optical switch, comprising:
   a) a first optic fiber waveguide, having a propagation constant, where an information-bearings optical signal is applied to the first optic fiber waveguide;
   b) a second optic fiber waveguide in the same plane as the first optic fiber waveguide, having a propagation constant identical to the propagation constant of the first optic fiber waveguide, where the first optic fiber waveguide and the second optic fiber waveguide are close enough to exhibit evanescent wave coupling under non-interference conditions; and
   c) a third optical waveguide in the same plane as the first optic fiber waveguide and the second optic fiber waveguide, having a propagation constant identical to the propagation constant of the second optic fiber waveguide when an optical control signal is not applied to the third optical waveguide, where the third optical waveguide is closer to the second optic fiber waveguide than the second optic fiber waveguide is to the first optic fiber waveguide, and where the propagation constant of the third optical waveguide is different from the propagation constant of the second optic fiber waveguide when the optical control signal is applied to the third optical waveguide so that the information-bearing optical signal may be switched between the first optic fiber waveguide and the second optic fiber waveguide.

2. The device of claim 1, wherein said third optical waveguide is an optic fiber waveguide.

3. The device of claim 1, wherein said third optical waveguide is a slab waveguide.

4. The device of claim 1, wherein said second optic fiber waveguide is 17 microns away from said first optic fiber waveguide and 11 microns away from said third optical waveguide.

5. The device of claim 1, wherein said third optical waveguide comprises a colloidal suspension of composite metal-coated semiconductor nanoparticles with diameters in the range of from 30 Angstroms to 40 Angstroms.

6. The device of claim 2, wherein said third optical waveguide is a slab waveguide.

7. The device of claim 6, wherein said second optic fiber waveguide is 17 microns away from said first optic fiber waveguide and 11 microns away from said third optical waveguide.

8. The device of claim 7, wherein said third optical waveguide comprises a colloidal suspension of composite metal-coated semiconductor nanoparticles with diameters in the range of from 30 Angstroms to 40 Angstroms.

9. An optical switch, comprising:
   a) a first optic fiber waveguide, having a propagation constant, where an information-bearing optical signal is applied to the first optic fiber waveguide;
   b) a second optic fiber waveguide in the same plane as the first optic fiber waveguide, having a propagation constant identical to the propagation constant of the first optic fiber waveguide, where the first optic fiber waveguide and the second optic fiber waveguide are close enough to exhibit evanescent wave coupling under non-interference conditions; and
   c) a third optical waveguide in the same plane as the first optic fiber waveguide and the second optic fiber waveguide, having a propagation constant that is different from the propagation constant of the second optic fiber waveguide when an optical control signal is not applied to the third optical waveguide so that the information-bearing optical signal may be switched between the first optic fiber waveguide and the second optic fiber waveguide, where the third optical waveguide is closer to the second optic fiber waveguide than the second optic fiber waveguide is to the first optic fiber waveguide, and where the propagation constant of the third optical waveguide is the same as the propagation constant of the second optic fiber waveguide when the optical control signal is applied to the third optical waveguide so that the information-bearing optical signal may not be switched between the first optic fiber waveguide and the second optic fiber waveguide.

10. The device of claim 9, wherein said third optical waveguide is an optic fiber waveguide.

11. The device of claim 9, wherein said third optical waveguide is a slab waveguide.

12. The device of claim 9, wherein said second optic fiber waveguide is 17 microns away from said first optic fiber waveguide and 11 microns away from said third optical waveguide.

13. The device of claim 9, wherein said third optical waveguide comprises a colloidal suspension of composite metal-coated semiconductor nanoparticles with diameters in the range of from 30 Angstroms to 40 Angstroms.

14. The device of claim 10, wherein said third optical waveguide is a slab waveguide.

15. The device of claim 14, wherein said second optic fiber waveguide is 17 microns away from said first optic fiber waveguide and 11 microns away from said third optical waveguide.

16. The device of claim 15, wherein said third optical waveguide comprises a colloidal suspension of composite metal-coated semiconductor nanoparticles with diameters in the range of from 30 Angstroms to 40 Angstroms.

* * * * *